US010270552B1

(12) United States Patent
Long, III

(10) Patent No.: US 10,270,552 B1
(45) **Date of Patent: *Apr. 23, 2019**

(54) SPORTS INFORMATION GATHERING AND BROADCASTING SYSTEM

(71) Applicant: Arthur B. Long, III, Knoxville, TN (US)

(72) Inventor: Arthur B. Long, III, Knoxville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/633,248

(22) Filed: Jun. 26, 2017

Related U.S. Application Data

(63) Continuation of application No. 13/231,686, filed on Sep. 13, 2011, now Pat. No. 9,806,832.

(60) Provisional application No. 61/382,203, filed on Sep. 13, 2010.

(51) Int. Cl.

| | |
|---|---|
| ***H04H 60/70*** | (2008.01) |
| ***H04H 60/54*** | (2008.01) |
| ***A63B 71/06*** | (2006.01) |
| ***A63B 24/00*** | (2006.01) |
| ***H04W 4/04*** | (2009.01) |

(52) U.S. Cl.
CPC ......... *H04H 60/70* (2013.01); *A63B 24/0021* (2013.01); *A63B 71/0622* (2013.01); *A63B 71/0669* (2013.01); *H04H 60/54* (2013.01); *H04W 4/04* (2013.01); *A63B 2024/0053* (2013.01); *A63B 2071/0691* (2013.01); *A63B 2220/12* (2013.01)

(58) Field of Classification Search
None
See application file for complete search history.

(56) References Cited

U.S. PATENT DOCUMENTS

| | | | | |
|---|---|---|---|---|
| 2007/0015586 A1* | 1/2007 | Huston | A63B 24/0021 | 463/42 |
| 2007/0097906 A1* | 5/2007 | Kato | H04W 88/16 | 370/328 |
| 2007/0200713 A1* | 8/2007 | Weber | H04L 67/24 | 340/573.1 |
| 2008/0092202 A1* | 4/2008 | Greenquist | A63B 71/06 | 725/135 |

* cited by examiner

*Primary Examiner* — Michael R Telan
(74) *Attorney, Agent, or Firm* — Pitts & Lake, P.C.

(57) ABSTRACT

Systems and methods of gathering, processing, and distributing information of a sporting event over a wireless network covering the sporting event, including a first portable device carried by a spotter of the sporting event to acquire global positioning system (GPS) data corresponding to the first portable device, to receive input data regarding status of the sporting event from the spotter, and to transmit the GPS and input data over the network, and a second portable device carried by a patron of the sporting event to receive the transmitted data, and to selectively display graphical representations of the transmitted data according to an input from the patron.

19 Claims, 32 Drawing Sheets

Fig.1
Welcome to the
Tournament Name
Patron Honors
TM
Tournament
Logo

Fig.2
Patron Honors
TM
Tournament
Go To Home
Logo
Tournament Name
Explore and enjoy all of the features of the Patron Honors system. Note the following instructions :
At any location, to return to the HOME screen touch
At any location, touch the logo to go BACKWARDS one screen.
On most screens, touching a Player's Name or the Hole Number will take you to the appropriate Player Status screen or Hole Activity screen.
To retrieve or send PERSONAL MESSAGES or locate friends on the course, select the News, History, Personal button on the Home Page.
Press Here to Continue & Enjoy

Fig.3
Tournament
Go To Home
Logo
Patron Honors
TM
Tournament Name
Player Status & Info
Scores Trends Parings
Current Course Action
Roars of the Course
Course & Hole Info
News History Personal

Fig.4
Tournament
Go To
Home
Logo
Patron Honors
TM
Tournament Name
To view a player's status
Select the First Letter
of the Last Name
A B C C E F
G H I J K L
M N O P Q R
S T U V W X Y Z

Fig.5
Tournament
Patron Honors
TM
Go To
Home
Logo
Tournament Name
Players in the field
M
Player M 1 Name
Player M 2 Name
Player M 3 Name
Player M 4 Name
Player M 5 Name
Player M 6 Name
Player M 7 Name
Player M 8 Name
Player M 9 Name
Player M 10 Name
N
Scroll with finger swipe for more Pairings

Fig.6
Tournament
Go To Home
Logo
Patron Honors
TM
Tournament Name
Select a Player
Player 1 Name
Player 2 Name
Player 3 Name
Player 4 Name
Player 5 Name
Player 6 Name
Player 7 Name
Player 8 Name
Player 9 Name
Player 10 Name

Fig.7
Tournament
Patron Honors
TM
Go To Home
Logo
Tournament Name
Player Name
plays
Brand Golf Clubs
Shouldn't You?
11:15 Tee Time Paired with Player B
Currently -8 thru hole 17 and tied for 9th
HIS SCORE CARDS
WHAT'S IN HIS BAG ?
WHERE IS HE NOW ?
BIO

Fig.8
Tournament
Go To Home
Logo
Patron Honors
TM
Tournament Name
Player Name
Best Masters Finish: Tied for 20 in 2009
Age: 21
Birthday: May 25, 1988
Home: England
How he qualified for the Tournament: Top 4 Open, Top 4 Tournament B, Top 30 tour money, Top 50 World, Tour win
Best Tournament Finishes: T10 Open Tournament, Win: Tournament C

Fig.9
Patron Honors
TM
Tournament
Go To Home
Logo
Tournament Name
Player Name -8 (-2 Today) T-193
Hole
Par
Round
Hole
Par
Round
Ace
Brd
Par
Bgy
Red No. = Hole not complete

Fig. 10
Patron Honors
TM
Tournament
Go To Home
Logo
Tournament Name
Club Brand Logo
Player Name
Carries these Brand Clubs
935 T2
9.5°
Driver
955 F 13
½ & 19 °
Fairway
BB
Forged
Irons
3-PW
XXXX
Milled
Wedges
54°, 60°
Visit Manufacturer @ Clubs XXX.com

Fig.13
Patron Honors
TM
Tournament
Go To Home
Logo
Tournament Name
To view the activity at a specific hole, touch the corresponding button
No. 1
405 yd Par 4
No. 2
545 yd Par 5
No. 3
310 yd Par 4
No. 4
220 yd Par 3
No.5
475 yd Par 4
No. 6
150 yd Par 3
No. 7
470 yd Par 4
No. 8
590 yd Par 5
No. 9
445 yd Par 4
No. 10
475 yd Par 4
No. 11
565 yd Par 4
No. 12
185 yd Par 3
No. 13
530 yd Par 5
No. 14
460 yd Par 4
No. 15
550 yd Par 5
No. 16
190 yd Par 3
No. 17
420 yd Par 4
No. 18
475 yd Par 4

Fig. 14
Tournament
Go To Home
Logo
Patron Honors
TM
Tournament Name
To view the Strategy, the History, and the Players Comments for a specific hole, touch the corresponding button
No. 1 405 yd Par 4
No. 2 545 yd Par 5
No. 3 318 yd Par 4
No. 4 220 yd Par 3
No.5 475 yd Par 4
No. 6 150 yd Par 3
No. 7 470 yd Par 4
No. 8 590 yd Par 5
No. 9 445 yd Par 4
No. 10 475 yd Par 4
No. 11 565 yd Par 4
No. 12 185 yd Par 3
No. 13 530 yd Par 5
No. 14 460 yd Par 4
No. 15 550 yd Par 5
No. 16 190 yd Par 3
No. 17 420 yd Par 4
No. 18 475 yd Par 4
Touch here to see statistics for all holes

Fig.16
Tournament
Go To Home
Logo
Patron Honors
TM
Tournament Name
No. 17 Name Par 5 - 510 yds
Brief History
A history of the course layout and construction of specific holes can be shown in this area
Naming the Hole
Many hole at golf courses are name for specific events, people, the geography, or features found on the hole. This area provides the golf club to present that history to the patrons.

Fig.18
Patron Honors
Tournament
Go To Home
Logo
Sponsor Name
Tournament Name
FAMOUS TOURNAMENT
Leaders
1 Player 1 16 thru 9
2 Player 2 14 thru 10
3 Player 3 13 thru 18
T4 Player 4 11 thru 17
T4 Player 5 11 thru 18
6 Player 6 10 thru 18
T7 Player 7 9 thru 17
T7 Player 8 9 thru 16
T9 Player 9 8 thru 14
T9 Player 10 6 thru 18
Next 10
Trends
Pairings

Fig.21
Patron Honors
TM
Tournament
Go To Home
Logo
Tournament Name
Pairings by Name
By Time
10:50 – Player A1 / Player A2
2:10 – Player B1 / Player B2
1:00 – Player C1 / Player C2
10:40 – Player D1 / Player D2
2:30 – Player E1 / Player E2
2:20 – Player F1 / Player D2
11:20 – Player G1 / Player G2
10:50 – Player H1 / Player H2
11:40 – Player J1 / Player J2
12:50 – Player K1 / Player K2
11:10 – Player L / Player L2
12:10 – Player M1 / Player M2
Scroll with finger swipe for more Pairings

Fig. 24
Patron Honors
Go To Home Loop

Fig.25
Patron Honors
TM
Tournament
Go To Home
Logo
Tournament Name
Messages
Severe Weather -Take Shelter
Due to rain Saturday's round will be delayed 2 hours
A playoff will begin on No.18 in 15 min
History
Tournament History
Champions by Year
Champions by Name
Personal
If you signed up, you can locate your friends on the Course
Locate Friends
You have a personal Message

Fig.27
Patron Honors
TM
Tournament
Go To
Home
Logo
Tournament Name
E-mail Massage:
4/9/11 2:17
555-555-5555
Dad, Just saw you on
TV. Can't believe that
shot. Wish I was there
with you. Call tonight.
J
Respond

Fig.29
Patron Honors
TM
Tournament
Go To
Home
Logo
Tournament Name
Champions
by Year
Year Champion Runner-Up
2010 Smith -14 Wall -13
2009 Play off Long -10 Camp -9
2008 Moon -8 Smith -6
2007 Jones +2 South +3
2006 Micheals -7 Cook -4
2005 Play off Wall -10 Dent -8
2004 Mays -9 Elks -7
2003 Play off Wells -7 Mace -7
2002 Walley -10 Butts -9
2001 Walley -17 David -12
2000 South -11 Elbert -7
Continue

SPORTS INFORMATION GATHERING AND BROADCASTING SYSTEM

CROSS-REFERENCE TO RELATED APPLICATIONS

This application is a continuation of U.S. application Ser. No. 13/231,686 filed on Sep. 13, 2011, and claims priority from U.S. Provisional Application No. 61/382,203 filed on Sep. 13, 2010, the disclosures of which are hereby incorporated by reference herein in their entirety.

FIELD OF INVENTION

The present general inventive concept relates generally to an information gathering, processing, and broadcasting system, and more particularly, to a sports information gathering, processing, and broadcasting system capable of gathering player and game information from a sporting event such as a golf tournament, processing that information, and broadcasting the information over a network to handheld devices carried by spectators of the sporting event.

BACKGROUND

It is desirable for spectators of sporting events, such as golf tournaments, to monitor player and game/tournament information during the sporting event. However, during certain events such as golf tournaments, it is difficult for spectators to get real-time information about the status players who may be located a great distance away from where the spectator is watching, or may not be visible at all. Moreover, due to tournament restrictions, spectators may be limited in the amount of access they have to the proximity of the players and surrounding golf course. Thus, spectators are limited in the amount of real-time information they can get about a particular player and his status, and how each player is doing relative to others during the course of the tournament, or on particular holes.

SUMMARY

Embodiments of the present general inventive concept provide systems and methods of gathering, processing, and broadcasting real-time information of the sporting event to portable devices carried by spectators of the sporting event.

Additional features and embodiments of the present general inventive concept will be set forth in part in the description which follows and, in part, will be obvious from the description, or may be learned by practice of the present general inventive concept.

Example embodiments of the present general inventive concept can be achieved by providing a system of gathering, processing, and distributing information of a sporting event over a wireless network covering the sporting event, including a first portable device carried by a spotter of the sporting event to acquire global positioning system (GPS) data corresponding to the first portable device, to receive input data regarding status of the sporting event from the spotter, and to transmit the GPS and input data over the network, and a second portable device carried by a patron of the sporting event to receive the transmitted data, and to selectively display graphical representations of the transmitted data according to an input from the patron.

The system can include a production module to selectively process and distribute the input data, on demand or otherwise, to the second portable device and/or to an external television network.

The first and second portable devices can be linked together via the network, and can be implemented in the form of programmable commercially available handheld devices.

The wireless network can be configured as a local MESH network to cover a geographical region including the sporting event.

Example embodiments of the present general inventive concept can also be achieved by providing a method of gathering, processing, and distributing sports information of a sporting event over a wireless network covering the sporting event, the method including acquiring global positioning system (GPS) data corresponding to a first portable device, inputting data to the first portable device regarding status of the sporting event from a spotter of the sporting event, transmitting the GPS and input data over the network to a second portable device carried by a patron of the sporting event, and selectively displaying graphical representations of the transmitted data on the second portable device according to inquiries of the patron.

The sporting event can be a golf tournament, and the method can include recording geographical and/or topographical information of a golf course of the tournament to generate a GPS coverage map of the golf course, transmitting the GPS coverage map to the second portable device, and selectively displaying graphical representations of golf ball locations relative to the golf course after the golf ball has been hit by a player of the golf tournament, based on the GPS coverage map and the location of the first portable device transmitted to the second portable device.

Example embodiments of the present general inventive concept can also be achieved by providing a method of gathering, processing, and broadcasting sports information of a sporting event over a network covering the sporting event, including inputting data regarding status and/or results of the sporting event to a first portable device carried by spotters of the sporting event, providing a second portable device to patrons of the sporting event, acquiring global positioning system (GPS) data corresponding to a location of the first portable device, transmitting the input and GPS data over the network to the second portable device, accepting a user input or request from a patron via the second portable device, and displaying a graphical representation of the transmitted data on the second portable device.

The method can include acquiring global positioning system (GPS) data corresponding to a location of the second portable device, and displaying a location of at least one second portable device relative to another second portable device on the at least one second portable device.

BRIEF DESCRIPTION OF THE DRAWINGS

The following example embodiments are representative of example techniques and structures designed to carry out the features of the present general inventive concept, but the present general inventive concept is not limited to these example embodiments. Moreover, in the accompanying drawings and illustrations, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying drawings in which.

DETAILED DESCRIPTION

Figure 1:
FIG. 1 illustrates a welcome screen displayed on a portable device according to an example embodiment of the present general inventive concept.

Reference will now be made to example embodiments of the present general inventive concept, examples of which are illustrated in the accompanying drawings and illustrations. The example embodiments are described herein in order to explain the present general inventive concept by referring to the figures.

Embodiments of the present general inventive concept can be implemented in connection with a commercially available portable device to provide a real time, interactive, information system to transmit information to spectators of a sporting event. Some embodiments provide a sports information gathering, processing, and broadcasting system capable of gathering player and game/tournament information from a sporting event, such as a golf tournament, and then processing and broadcasting the information over a network to handheld devices carried by spectators of the sporting event to better inform the spectators about the game, for example by providing information about the players, results, and status of the game, in real time. It is noted that although the example embodiments of the present general inventive concept described herein are directed to gathering, processing, and broadcasting information from a golf tournament, the devices, techniques, and methods of the present general inventive concept are not limited to golf tournaments, and can be applied to any type of sporting event, such as football games, baseball games, automobile races, and the like, or non-sporting events, where real-time information, status, and/or results from the event are desired by spectators or patrons of the event.

It is noted that the following detailed description may recite various descriptive terms such as horizontal, vertical, top, bottom, upward, downward, left, right, etc., when referring to the exemplary figures, but the present general inventive concept is not limited to any such terms or physical orientations. Such terms are used for convenience of description only, and could be reversed, modified, or interchanged without departing from the broader scope and spirit of the present general inventive concept.

Referring to the example embodiments illustrated herein, a number of different ways of operation can be used. The drawings provided as part of this patent application generally depict an interactive display apparatus and method operating within a portable handheld device which can be carried by a spectator of a golf tournament to receive various types of game and player information resulting from the golf tournament over a wireless communication network covering the bounds of the golf course. For example, the portable device can receive and transmit MESH signals using 802.11n technology with integrated RF intelligence. The portable device can be configured to process, store, and display data in pre-formatted screens, such as the example display screens illustrated herein.

The portable device can include GPS capabilities to provide location information to the user. In some embodiments, the portable device can communicate with a GPS communication unit, such as but not limited to GPS satellites, to acquire GPS data such as latitude, longitude, speed, and direction of the portable unit. Other methods of communicating with GPS devices may be chosen with sound engineering judgment to provide real time location information to the portable unit. For example, the portable device can communicate with a variety of known or later developed GPS communication devices, such as cell phone towers, repeater stations, or other types of communication systems chosen with sound engineering judgment to provide location information to the portable device. In some embodiments, a GPS survey or map of the course prior to the tournament can be made to collect and record relevant geographical and/or topographical data pertaining to a particular golf course for input to the portable devices. This mapping data can be used to accurately portray hole representations and ball locations, and to generate a coverage map of the golf course, enabling the broadcasting system to track the location of a selected golfer around the golf course, based on GPS information, and view the location of selected players, or other patrons who are carrying a similar portable device, for example.

Embodiments of the present general inventive concept include a spotter module, a production module, and a patron module. These modules communicate via an advanced computer network, for example a private local broadband data wireless area network (MESH). The spotter module allows one or more spotters on the golf course to capture and input data to the network using the portable device described herein and configured to receive inputs from the spotters on the golf course to perform the spotter functions. The information is obtained from personnel (spotters) who have special permitted access to the course and players in order to track the location and distance of a player's balls, including special knowledge regarding status of the event, for example, club selection, lie of the ball, condition of ball, distance from markers, length of putt, order of play, scores, etc., thus enabling the spotters to input information using the spotter's portable device to the network for transmission to the patron portable devices, in as real-time as possible, to enhance, not replace, the patron's overall tournament enjoyment and experience. The information input by the spotters is also suitable for broadcast on TV. As used herein, the term 'spotter' refers to any person or thing, typically authorized by the sporting event, which has been granted access to the participants and/or event venue to provide detailed reports of outcomes of the sporting event, such as but not limited to spotters deployed by television broadcasters to follow professional golfers around a golf course during tournament play to report on status of the player's ball or other status of the player and/or golf tournament.

The production module collects, processes, organizes, and distributes the information for display on the portable hand held devices and programmed for the spectator functions. The patron module responds in real-time to inquiries of the patrons of the tournament using the portable devices to selectively display various information of interest. The patron portable devices can be issued by tournament organizers or sponsors, and the devices can be configured to display sponsorship messages, in addition to tournament information, for advertisement purposes. The distribution hardware (e.g., MESH network) is virtually invisible, and the operation of the portable devices by the patrons is relatively silent and does not emit disruptive noise or flashes. The portable devices are relatively small and discrete, and can be easily identified as authorized units on the golf course.

The interactive handheld device can receive information gathered from the spotter transmitter and can communicate the information to a spectator carrying the handheld device via wireless communication network. Data such as course information, player results, and status information can be transmitted from the spotter transmitter to the patron module via a suitable wireless network, such as 802.11 a/b/g and or IEEE 802.11n standards, or other known or later developed communication technologies, including, but not limited to, Enterprise Wireless Mesh systems (Mesh) and other broadband wireless technologies.

The information and data entered by the spotter can be reviewed, processed, and displayed by the production module where decisions can be made by a network engineer and/or a member of the golf event broadcasting crew as to whether and/or when to transmit the input data from the input spotter module for instance recall for television (TV) production or other broadcast activities. For example, the techniques, apparatuses, and methods of the present general inventive concept make it possible to process the gathered sports information for instance distribution to a patron module, i.e., patrons who are carrying a portable device in communication with the Mesh or other wireless network covering the golf event in accordance with the present general inventive concept. The portable devices provide instant access for queries and receipt of information, are unobtrusive, handle a volume of transmissions generated by a gallery information system, and are not dependent on outside infrastructures for operation. For example, unlike known verbal or audible transmission systems that cannot simultaneously handle inputs from a number of spotters covering every player in the field, leading to large latency problems in delivering the data to patrons in real time, the systems and methods of the present general inventive concept have the capacity to gather, process, and distribute information from spotters covering all players in the field simultaneously, making the present system as real-time as possible in distributing information to patrons regarding all players in the field, either on demand or otherwise (i.e., force-fed to the portable devices), depending on the nature of the information.

The portable devices of the spotters and patrons may or may not be the same type of commercially available device. In some embodiments, the spotter module can include a spotter transmitter device, for example an Apple iPod Touch® or similar handheld device, which can be carried by a spotter who walks the golf course, usually with a specified group of golfers, and inputs information about the status and results of the players in the group for transmission over the network. For example, the spotter can input information about the location, condition, and "lie" of a particular player's ball, the order of play of various players in the group, club selection of players, condition of ball, and other real time events regarding status of the game, course conditions, or any other game activity. The portable device carried by the patrons in the patron module can be a similar handheld device having a user interface and display screen to selectively display tournament information gathered from the spotters, as well as other information available from any number of sources, for example, weather information, course information, messages and/or information, current or stored, available to the network. In the example embodiments the portable devices are software-based programmable units, with touch buttons as opposed to fixed hardware buttons. The spotter's units can be enhanced to include GPS capability via additional equipment and/or connections, and the patron portable devices can be uniquely configured to make queries of the production or command module.

In the example embodiments described and illustrated herein, the portable are configured to receive and transmit MESH signals (802.11n technology with integrated RF intelligence) or similar signals, processes data, store data, and display data in pre-formatted screens. In some embodiments, the circuitry of the portable device used by the spotter is programmed to record and transmit various characteristics, such as but not limited to golfers appearance, golfers equipment, golfers ball general location, golfers ball GPS location, golfers ball condition, golfers strokes as they occur, golfers penalty strokes, the club which Golfers are to use, and time periods of golfers next actions. The information is a real-time as possible as the information does not rely on any outside infrastructure and only uses an infrastructure wholly contained on the grounds of the tournament of in close proximity thereto.

In some embodiments, the production module includes one or more on-site, centrally located computer servers, processors, and interface equipment to receive and transmit MESH signals (802.11n technology with integrated RF intelligence) or similar signals to and from about 20,000 portable devices. However, the present general inventive concept is not limited to any particular number or type of portable devices, or to any particular type of communications network. In some embodiments, the production module receives, processes, and stores the information transmitted by the spotter module, displays the information in television control studios, and transmits the processed information to the portable devices of the patron module as the information is available and/or when requested by users of the portable devices.

Typically, a MESH (802.11n technology with integrated RF intelligence) or similar network, properly configured, can be expected to cover a large area (e.g., up to about 500 acres) for the transmission of data to and from the various components, for example, the spotter, production, and patron modules. The display screens can be implemented on commercially available hand held devices suitable to receive MESH signals (802.11n technology with integrated RF intelligence) or similar signals, configured to process, store, and display the data in pre-formatted screens, including logos, advertisements, or other visual representations.

FIG. 1 illustrates a welcome screen displayed on a portable device according to an example embodiment of the present general inventive concept. As illustrated in the accompanying figures, the welcome screen sets the tone and style of the portable device menu screens, and can be configured to reflect the motif and traditions of a particular tournament, including a tournament logo. In some embodiments, the welcome screen can be displayed for a predetermined amount of time when the portable device is first turned on and can automatically transition to another screen, such as the instruction screen of FIG. 2. As illustrated in FIG. 1, the welcome screen can include information such as event and sponsor names, logos, event pictures, and other graphics display areas.

Figure 2:
FIG. 2 illustrates an instruction screen displayed on a portable device according to an example embodiment of the present general inventive concept.

FIG. 2 illustrates an instruction screen displayed on a portable device according to an example embodiment of the present general inventive concept. The instruction screen can be automatically retrieved by the Welcome Screen display, or can be retrieved by touching a selected area of the welcome screen. As illustrated in FIG. 2, the instruction screen is configured to display instructions for operation of the system display area, and can include an Instruction Screen exit button.

Figure 3:
FIG. 3 illustrates a home screen displayed on a portable device after exiting the instruction screen or upon touching the Tournament Logo button on any screen according to an example embodiment of the present general inventive concept.

FIG. 3 illustrates a home screen displayed on a portable device after exiting the instruction screen or upon touching the Tournament Logo button on any screen as related on the instruction screen and according to an example embodiment of the present general inventive concept. As illustrated in FIG. 3, the home screen includes a Player Status and Information function selection button and picture, Current Course Action function selection button and picture, Course & Hole Information function selection button and picture, Scores, Trends, Pairings function selection button and picture, Roars of the Course function selection button and picture, and News, History, Personal function selection button and picture.

Figure 4:
FIG. 4 illustrates a player selection menu produced after selecting the "PLAYER STATUS AND INFORMATION" button on the home page menu according to an example embodiment of the present general inventive concept.
Figure 5:
FIG. 5 illustrates a player selection sub-menu produced after selecting a letter corresponding to the last name of a player on the player selection menu (FIG. 4) including all the players in the field whose last name begins with the selected letter according to an example embodiment of the present general inventive concept.
Figure 6:
FIG. 6 illustrates an alternative player selection sub-menu produced after selecting a letter corresponding to the last name of a player on the player selection menu including all the players in the field whose last name begins with the selected letter according to an example embodiment of the present general inventive concept.

FIG. 4 illustrates a player selection menu produced after selecting the "PLAYER STATUS AND INFORMATION" button on the home page menu according to an example embodiment of the present general inventive concept. Upon touching the button, a player menu screen appears on the display screen of the portable device. In the embodiment of FIG. 4, the user can select the first letter of the last name of a player of the golf tournament, which in turn will cause a player selection sub-menu to appear listing all of the players whose name begins with the selected letter, as illustrated in FIGS. 5 and 6. It is noted that all of the menus and screens displayed on the portable device can include advertising areas to communicate advertising messages and information to the patron. Each of the menus and screens can be individually or collectively sponsored for fees. It is also possible to communicate real-time alerts, for example weather alerts, to the patrons via the wireless network and handheld devices. The information presented in all the menus can be derived from data inputted through the spotter module, the production module, system memory, or any other suitable transmission means, and/or combinations thereof. The screen can include instructions for selection of a player. For example, to view a player's status, the user can select the first letter of the player's last name. In some embodiments, the screen includes buttons to retrieve all players with last names beginning with the associated letter, although the buttons could be implemented to provide a list of all players displayed with an upward or downward figure swap on the display area, which swaps would arrange the names in alphabetical order.

FIG. 5 illustrates a player selection sub-menu produced after selecting a letter corresponding to the last name of a player on the player selection menu including all the players in the field whose last name begins with the selected letter according to an example embodiment of the present general inventive concept. The user can select a player by touching his name. In some embodiments, the screen displays the letter of the alphabet after which all players whose last name begins with that letter, the names of the players whose last name begins with the selected letter, as well as the next letter of the alphabet that follows the letter shown, space permitting. The screen can include instructions for scrolling the screen to reveal additional letters and players. For example, a scroll function using a finger swipe to display additional players or pairings.

FIG. 6 illustrates an alternative player selection sub-menu produced after selecting a letter corresponding to the last name of a player on the player selection menu including all the players in the field whose last name begins with the selected letter according to an example embodiment of the present general inventive concept. The user can select a player by touching his name or picture.

In some embodiments, the screens include player information produced after selecting a particular player on the player selection sub-menu. This option enables a user to access a variety of information about a particular player, such as real-time tournament results entered and transmitted by a spotter of the golf tournament over the network using a spotter transmitter, and/or pre-programmed information such as club information and/or endorsements of the player stored in memory.

Figure 7:
FIG. 7 illustrates a player status screen produced after selecting a player from a player selection sub-menu according to an example embodiment of the present general inventive concept.

FIG. 7 illustrates a player status screen produced after selecting a player from a player selection menu according to an example embodiment of the present general inventive concept. This option enables a user to access a variety of information about a particular player, such as real-time tournament results entered and transmitted by a spotter of the golf tournament over the network using a spotter transmitter device, and/or pre-programmed information such as club information and/or endorsements of the player stored in memory. For example, as illustrated in FIG. 7, the screen can include the name and picture of the player selected by the player selection screen, a flag of the home country of the selected player, the tee time and playing partner(s) of the selected player, the player's current score relative to par, last hole completed, and ranking in the tournament.

Referring to FIGS. 7 to 11, the player status screen can include a button labeled His Score Cards to recall scorecards for each round of the selected player, a button labeled Where is He Now to recall a screen showing a graphic representation of the hole on which the selected player is currently playing, and a graphic representation of where the player is located on that hole. The screen can also include a button labeled What's in His Bag to recall a screen showing the clubs and equipment carried by the selected player and a button labeled BIO to recall a screen showing the player's biographical information.

Figure 8:
FIG. 8 illustrates a player biography screen produced after selecting the BIO button on the player status screen according to an example embodiment of the present general inventive concept.

FIG. 8 illustrates a player biography screen produced after selecting the BIO button on the player status screen according to an example embodiment of the present general inventive concept. The screen can include the name and picture of the player selected by the player selection screen and a flag of the home country of the selected player. The biographical information can include, but is not limited to, playing history, top finishes, and event entry parameters of the selected player.

Figure 9:
FIG. 9 illustrates a player scorecard screen produced after selecting the "SCORECARD" button on the player status screen according to an example embodiment of the present general inventive concept.

FIG. 9 illustrates a player scorecard screen produced after selecting the "SCORECARD" button on the player status screen according to an example embodiment of the present general inventive concept. The scorecard screen can include the name of the selected player, the score relative to par for the tournament and the current round, and total strokes for the selected player. In some embodiments, the scorecard screen can include a front nine holes scorecard and a back nine holes scorecard for all days of play for the selected player. The scores can be color coded. For example, different colors can be used for different scores relative to par. This option enables the patron to view the real-time scores of a selected golfer, even if the patron is not following the golfer or otherwise cannot view the tournament scoreboards from his location on the golf course. It also provides for number of strokes taken by the player on the current hole, even before the hole is completed.

Figure 10:
FIG. 10 illustrates a players equipment screen produced after selecting the "WHAT'S IN HIS BAG" button of the player status screen according to an example embodiment of the present general inventive concept.

FIG. 10 illustrates a players equipment screen produced after selecting the "WHAT'S IN HIS BAG" button of the player status screen according to an example embodiment of the present general inventive concept. This option enables the user to view information about the equipment being carried in the player's bag, such as the number and type of clubs, club manufacturer, ball manufacturer, and the like. This information can be pre-programmed into the system based on information provided by the golfer or otherwise available to the system prior to play, and again demonstrates the possibility of screen sponsorship and/or endorsements for display on the portable device.

Figure 11:
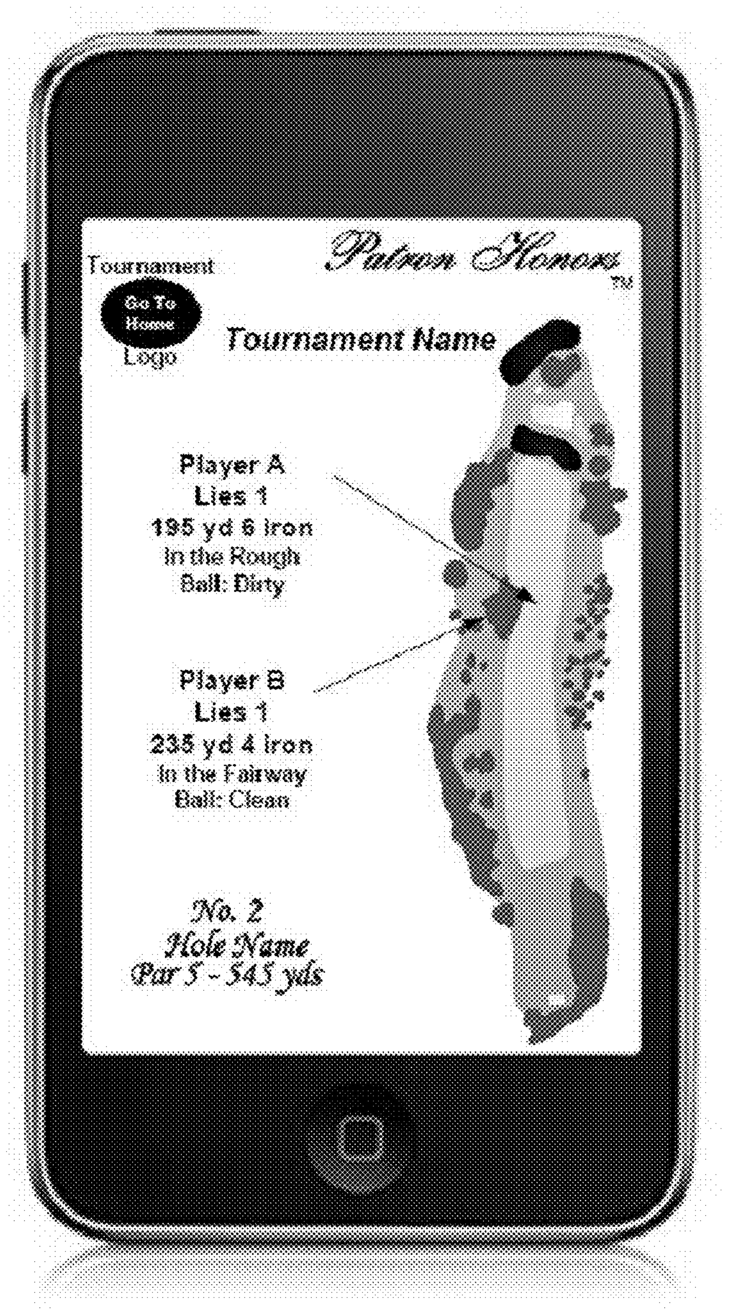
FIG. 11 illustrates a hole activity screen including information about the location of the player's golf ball on the golf course produced after selecting the "WHERE IS HE" icon on the player status screen according to an example embodiment of the present general inventive concept.

FIG. 11 illustrates a hole activity screen including information about the player's location on the golf course produced after selecting the "WHERE IS HE" icon on the player status screen according to an example embodiment of the present general inventive concept. As illustrated in FIG. 11, the screen can include a graphic representation of the course hole a selected player is currently playing, the playing partner of the selected player, the name, number, and description of the course hole the selected player is currently playing, and the like. Here, the devices of the present general inventive concept can be configured to incorporate, collect, record, and input relevant data pertaining to a particular golf course to the portable devices, and utilize that information to generate a coverage map of the golf course, enabling the broadcasting system to track the location of a selected golfer around the golf course, based on GPS information, and view the location of selected players, or other patrons who are carrying a similar portable device. The patron may also retrieve additional information about the players and the hole shown on the hole activity screen without having to return to the home screen by touching the name of the players or the hole on the hole activity screen.

Figure 12:
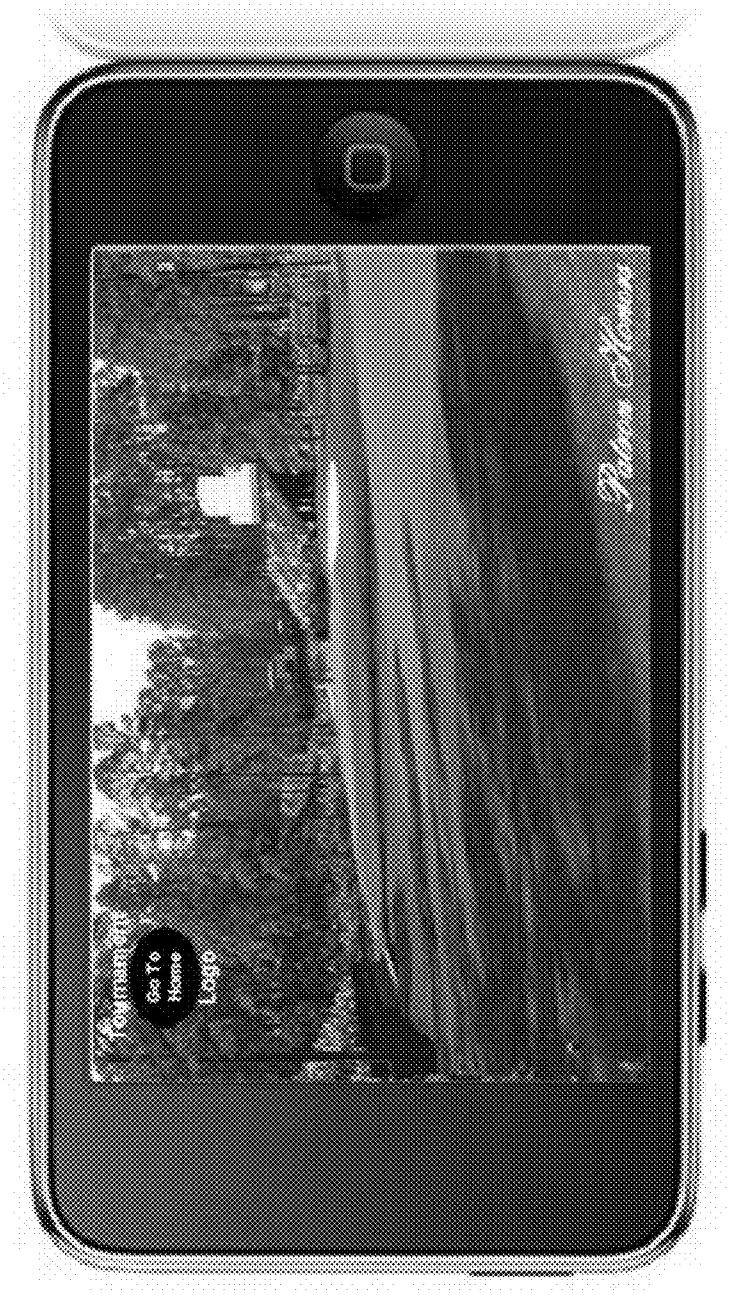
FIG. 12 illustrates a bubble view including a photo image from the current location of the player produced after selecting the player's ball on the hole activity screen according to an example embodiment of the present general inventive concept.

FIG. 12 illustrates a bubble view including a photo image from the current location of the player produced after touching the player's ball on the hole activity screen according to an example embodiment of the present general inventive concept. In some embodiments, the photographic image from the current location of a player and can be rotated 360 degrees on the horizontal axis and 45 degrees on the vertical axis, although the present general inventive concept is not limited to any particular degree.

Figure 13:
FIG. 13 illustrates a course hole selection screen produced by selecting the "CURRENT COURSE ACTION" button on the home screen according to an example embodiment of the present general inventive concept.

FIG. 13 illustrates a course hole selection screen produced by selecting the "CURRENT COURSE ACTION" button on the home screen according to an example embodiment of the present general inventive concept. In order to view the activity at a specific hole, the user is instructed to touch a corresponding button on the course hole selection screen. Here, it is possible to incorporate maps of the golf course in conjunction with real-time information inputted to the system by spotters to present real-time information regarding the status of players on a particular hole. Buttons are provided to retrieve individual hole information with hole number, distance, and par labels for each hole.

Figure 14:
FIG. 14 illustrates an course hole selection screen produced by selecting the "COURSE & HOLE INFORMATION" button on the home screen according to an example embodiment of the present general inventive concept, including a button to see statistics for all holes.

FIG. 14 illustrates a course hole selection screen produced by selecting the "COURSE AND HOLE INFO" button on the home screen according to an example embodiment of the present general inventive concept, including a button to see statistics for all holes.

Figure 15:
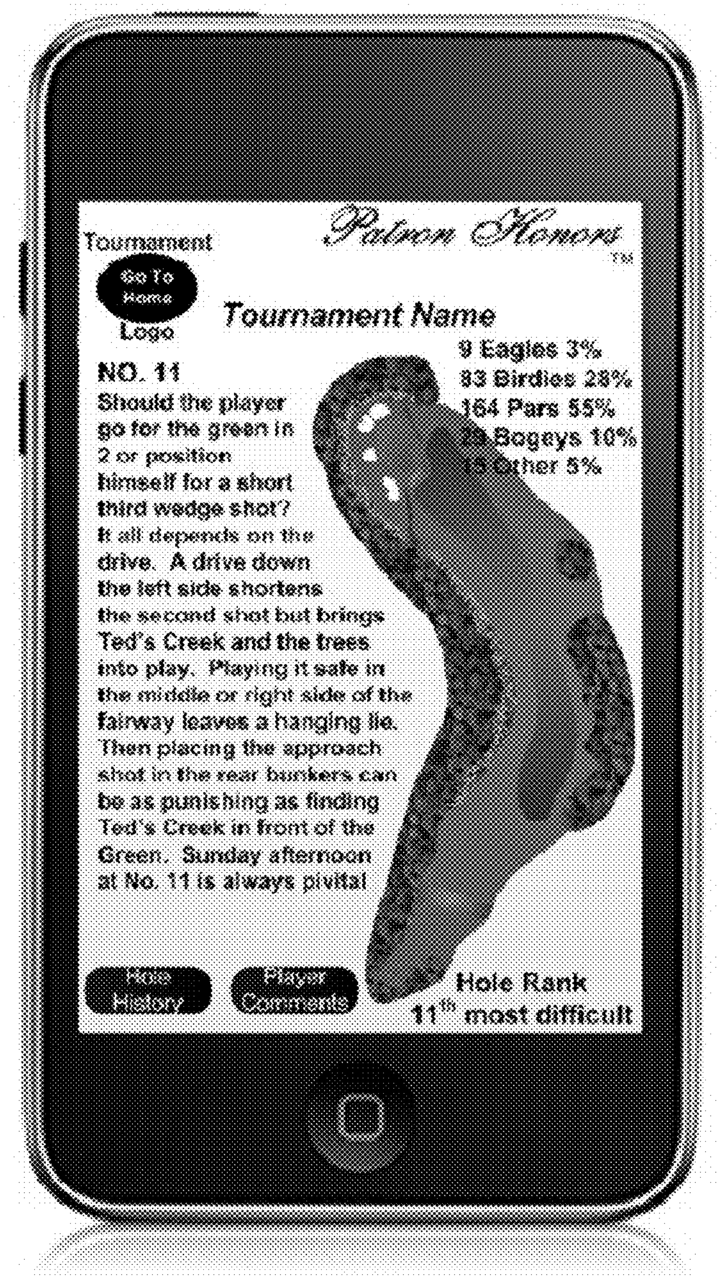
FIG. 15 illustrates a hole diagram and strategy screen, which includes current statistics for that hole, produced by selecting a corresponding hole button on the course hole selection screen according to an example embodiment of the present general inventive concept.

FIG. 15 illustrates a hole diagram and strategy screen produced by selecting a corresponding hole button on the course hole selection screen (FIG. 14) according to an example embodiment of the present general inventive concept. As illustrated in FIG. 15, the screen includes a graphic representation of the course hole selected, current statistics for that particular hole, a pre-stored narrative of various strategies for playing the selected hole, a button for retrieving the hole history, and a button for retrieving the player's comments on the hole.

Figure 16:
FIG. 16 illustrates a hole history screen produced by selecting the "HOLE HISTORY" button on the hole diagram and strategy screen according to an example embodiment of the present general inventive concept.

FIG. 16 illustrates a hole history screen produced by selecting the "HOLE HISTORY" button on the hole diagram and strategy screen according to an example embodiment of the present general inventive concept. This option enables the user to view the number, name, par rating, distance, and history of a selected hole.

Figure 17:
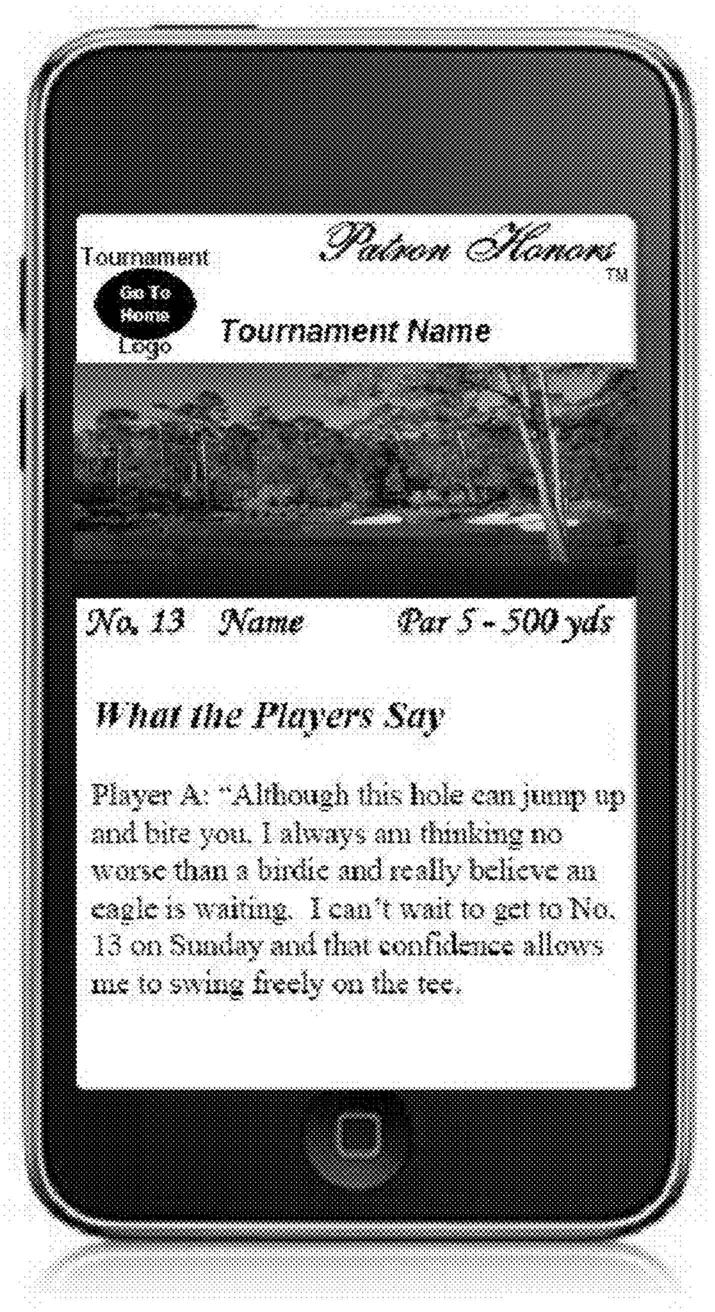
FIG. 17 illustrates a player comments screen produced by selecting the "PLAYER COMMENTS" button on the hole diagram and strategy screen according to an example embodiment of the present general inventive concept.

FIG. 17 illustrates a player comments screen produced by selecting the "PLAYER COMMENTS" button on the hole diagram and strategy screen according to an example embodiment of the present general inventive concept. This option enables the user to view the number, name, par rating, distance, and comments by players of a selected.

Figure 18:
FIG. 18 illustrates a scoreboard screen produced by selecting the "SCORES, TRENDS, PAIRINGS" button on the home screen according to an example embodiment of the present general inventive concept.

FIG. 18 illustrates a scoreboard screen produced by selecting the "SCORES, TRENDS, PAIRINGS" button on the home screen according to an example embodiment of the present general inventive concept. As illustrated in FIG. 18, the scoreboard screen can include an event picture or graphics display area, for example, to display an iconic scoreboard of the event. The scores of the players can be sorted from best to worse scores, indicating a player's position in the tournament, scores relative to par, and the last hole completed for each player. In the embodiment of FIG. 18, ten players are displayed at one time, with a button to recall the next ten players. The screen includes a button to retrieve the trend graph of leading players, and a button to retrieve the pairings of players by either tee time or alphabetical order.

Figure 19:
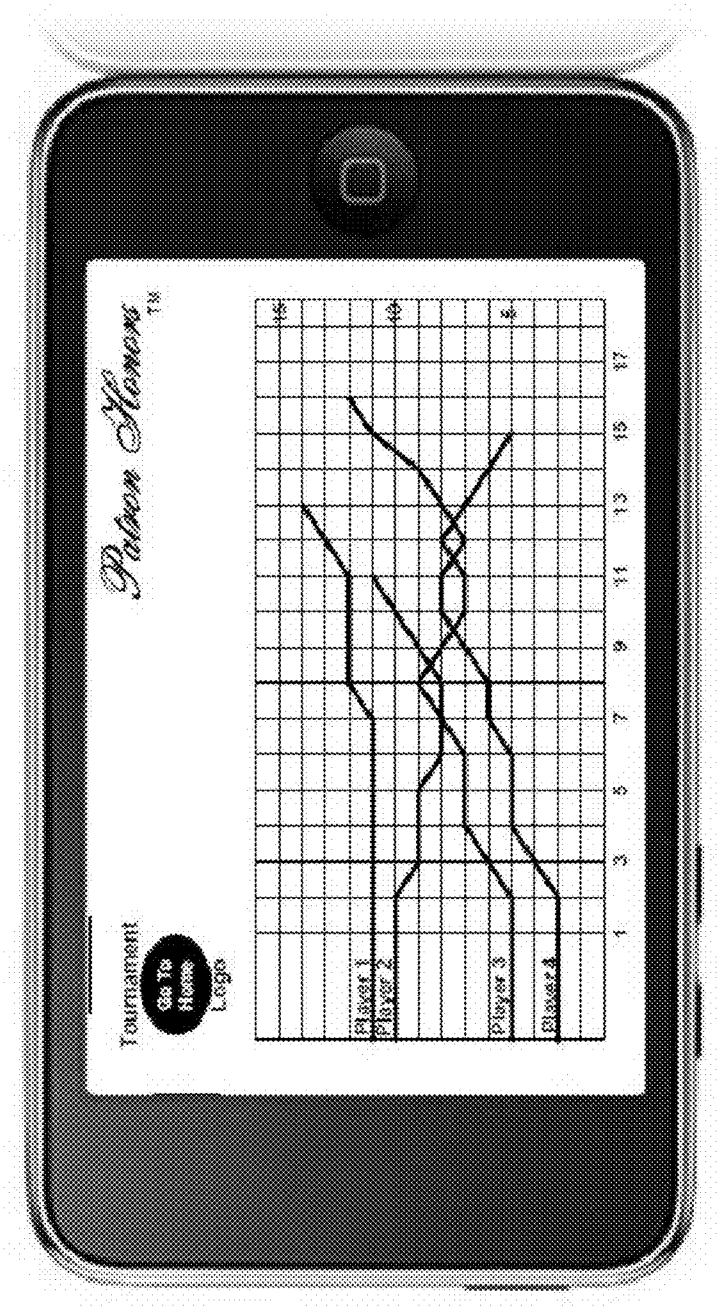
FIG. 19 illustrates a trends screen produced by selecting the "TRENDS" button on the scoreboard screen according to an example embodiment of the present general inventive concept.

FIG. 19 illustrates a trends screen produced by selecting the "TRENDS" button on the scoreboard screen according to an example embodiment of the present general inventive concept. In this embodiment, the trends screen includes a graph of the leading and/or selected players.

Figure 20:
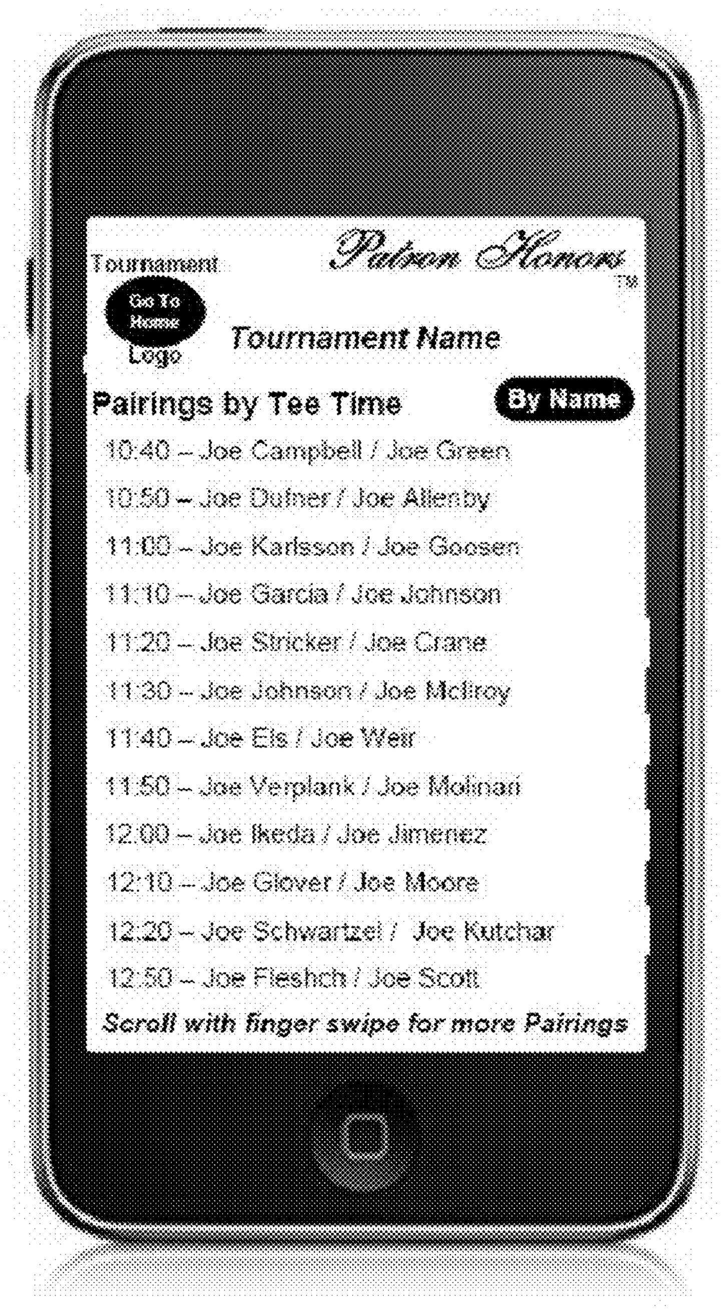
FIG. 20 illustrates a pairings by tee time screen produced by selecting the "PAIRINGS" button on the scoreboard screen according to an example embodiment of the present general inventive concept.
Figure 21:
FIG. 21 illustrates a pairings by name screen produced by selecting the "BY NAME" button on the pairings by tee time screen according to an example embodiment of the present general inventive concept.

FIG. 20 illustrates a pairings by tee time screen produced by selecting the "PAIRINGS" button on the scoreboard screen according to an example embodiment of the present general inventive concept. This option enables the user to touch a button to retrieve a pairing by name screen (FIG. 21). The list of player pairings by tee time can be scrolled up or down with a corresponding swipe of a finger on the screen, including instructions for scrolling the page with a scroll for more pairings.

FIG. 21 illustrates a pairings by name screen produced by selecting the "BY NAME" button on the pairings by tee time screen according to an example embodiment of the present general inventive concept.

Figure 22:
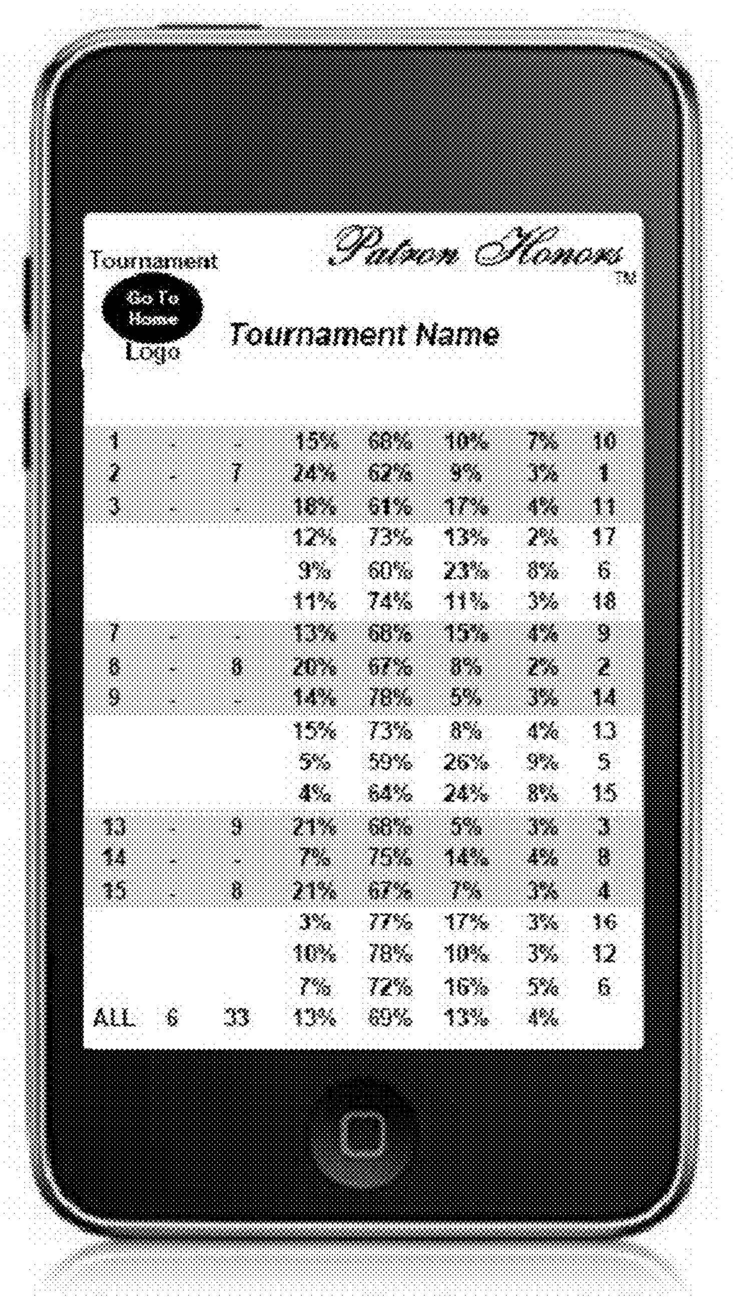
FIG. 22 illustrates a hole rankings screen produced by selecting the "Touch here to see statistics for all holes" button on the course hole selection screen of FIG. 14 according to an example embodiment of the present general inventive concept.

FIG. 22 illustrates a hole rankings screen produced by selecting the "Touch here to see statistics for all holes" button on the alternative course hole selection screen of FIG. 14 according to an example embodiment of the present general inventive concept. As illustrated in FIG. 22, the hole rankings screen can display a table of statistics with the following headings for columns: Hole, Aces, Eagles, Birdie, Pars, Bogeys, Others, Rank, and where Aces, Eagles, and Rank are in absolute values and all other values are percentages. In this embodiment, all holes are represented by one line, as is the total of all holes.

Figure 23:
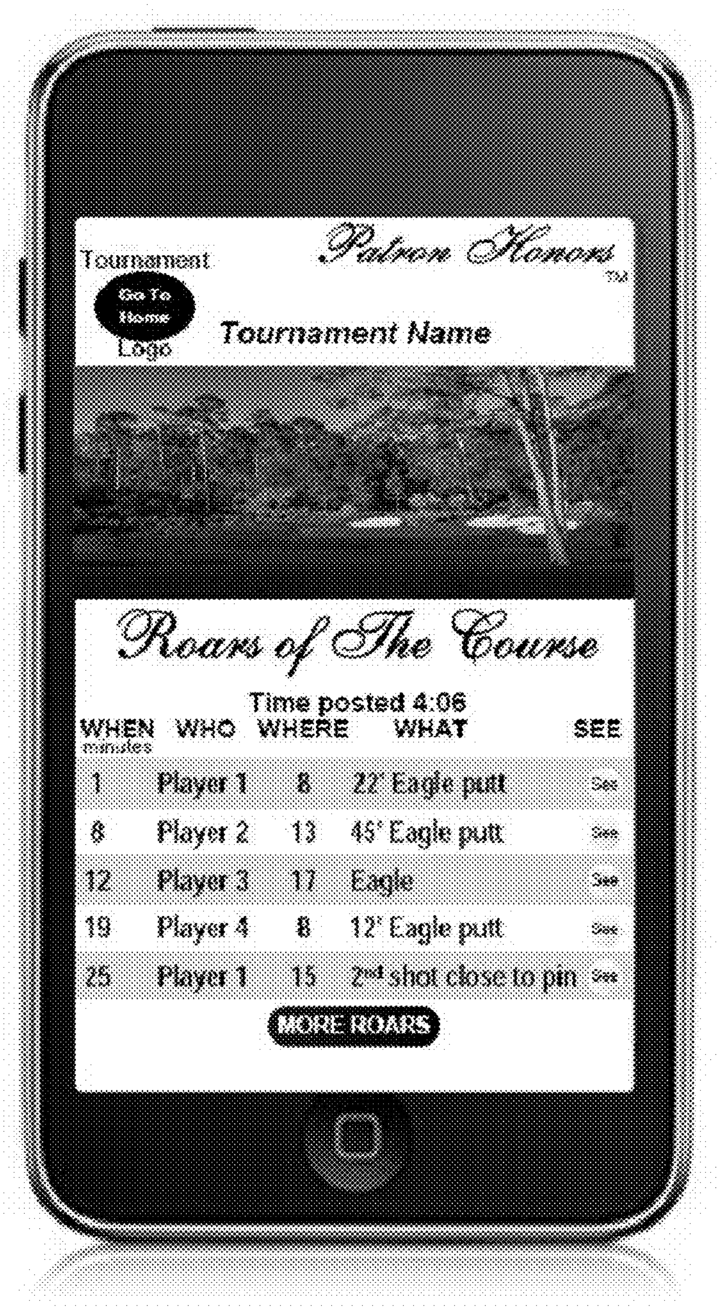
FIG. 23 illustrates a roars of the course screen including information about certain exceptional tournament activity produced after selecting the "ROARS OF THE COURSE" button on the home screen according to an example embodiment of the present general inventive concept.
Figure 24:
FIG. 24 illustrates a roars video screen showing a replay video, provided by the television broadcaster of the corresponding roars event according to an example embodiment of the present general inventive concept.

FIG. 23 illustrates a roars of the course screen including information about certain exceptional tournament activity produced after selecting the "ROARS OF THE COURSE" button on the home screen according to an example embodiment of the present general inventive concept. Here, the user can press the "ROARS OF THE COURSE" button on the home page, causing the roar alert page to appear on the screen, displaying notable events and/or results from the golf tournament or other sporting event to the user. For example, the user can view the time of information posting, together with a table of significant tournament events (shots) with the following headings for columns: WHEN, WHO, WHERE, WHAT, SEE. The user can see the age of the event in minutes from the posting time, who is the player making the shot, where is the hole where the event happened, what is a short narrative of the event, and can retrieve and view a video of the event by selecting a button to retrieve a video of the event (FIG. 24). The screen can include a MORE ROARS button to display additional notable events.

FIG. 24 illustrates a roars video screen showing a replay video of the corresponding roars event according to an example embodiment of the present general inventive concept. In some embodiments, the production module can transmit a television video replay of the corresponding event to the patron portable device.

Figure 25:
FIG. 25 illustrates a messages, history, personal screen produced by selecting the "NEWS, HISTORY, PERSONAL" button on the home screen according to an example embodiment of the present general inventive concept.

FIG. 25 illustrates a messages, history, personal screen produced by selecting the "NEWS, HISTORY, PERSONAL" button on the home screen according to an example embodiment of the present general inventive concept. Here, it is possible to communicate various public service, weather related, tournament host directed information, or other announcements of concern to the user. For example, the screen can include an area for messages from the tournament officials, a button to retrieve Tournament History, a button to retrieve tournament Champions by Year, a button to retrieve tournament Champions by Name, a button to retrieve personal messages, and a button to retrieve a friend's location screen.

Figure 26:
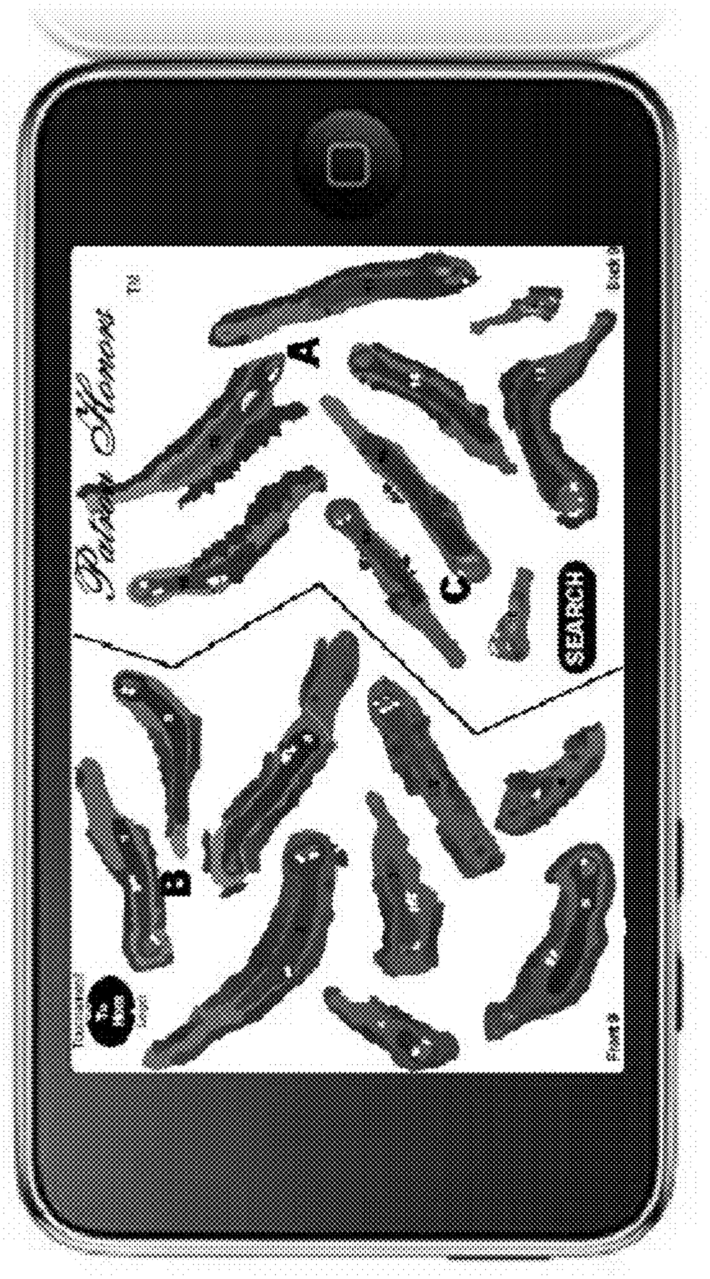
FIG. 26 illustrates a friend locator screen produced by selecting the "LOCATE FRIENDS" button on the messages, history, personal screen according to an example embodiment of the present general inventive concept.

FIG. 26 illustrates a friend locator screen produced by selecting the "LOCATE FRIENDS" button on the messages, history, personal screen according to an example embodiment of the present general inventive concept. Using GPS capability of the handheld device programmed for and issued to patrons, this option enables the user to view a graphic representation of the golf course with letter labels indicating the position of selected individuals. For example, individuals that registered with the tournament officials could be programmed into a particular portable device to enable the portable device to track the pre-registered patrons during the tournament.

Figure 27:
FIG. 27 illustrates a personal messages screen produced by selecting the "YOU HAVE A PERSONAL MESSAGE" button on the messages, history, personal screen according to an example embodiment of the present general inventive concept.

FIG. 27 illustrates a personal messages screen produced by selecting the "YOU HAVE A PERSONAL MESSAGE" button on the messages, history, personal screen according to an example embodiment of the present general inventive concept. For example, email or voice messages for the user are re-directed to the unit using the user's personal e-mail address. The screen includes a respond button that retrieves a typing into the screen to respond to the author of the original message. The tournament host can limit the use of messages received and transmitted as it wishes.

Figure 28:
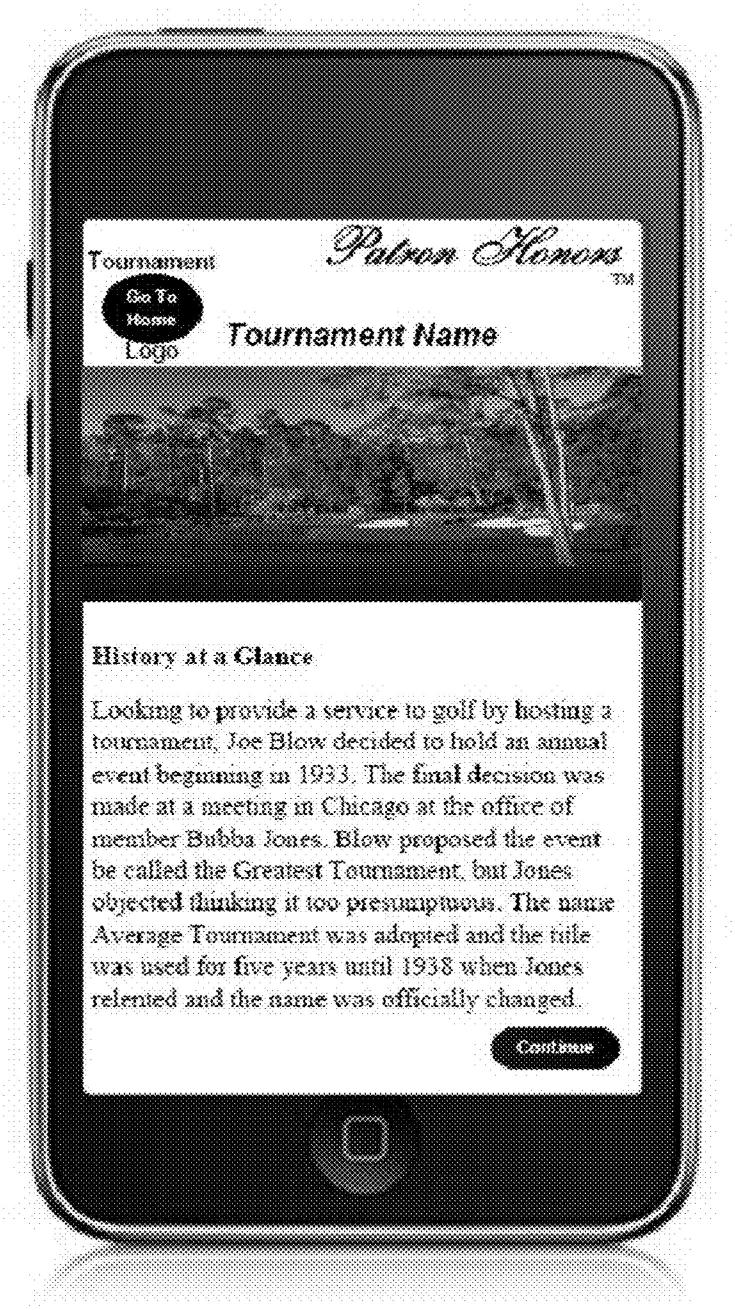
FIG. 28 illustrates a tournament history screen produced by selecting the "TOURNAMENT HISTORY" button on the messages, history, personal screen according to an example embodiment of the present general inventive concept.

FIG. 28 illustrates a tournament history screen produced by selecting the "TOURNAMENT HISTORY" button on the messages, history, personal screen according to an example embodiment of the present general inventive concept. In this embodiment, the screen displays a predetermined narrative history of the Club and Tournament.

Figure 29:
FIG. 29 illustrates a champions by year screen produced by selecting the "CHAMPIONS BY YEAR" button on the messages, history, personal screen according to an example embodiment of the present general inventive concept.

FIG. 29 illustrates a champions by year screen produced by selecting the "CHAMPIONS BY YEAR" button on the messages, history, personal screen according to an example embodiment of the present general inventive concept, including a list of previous tournament champions sorted by year.

Figure 30:
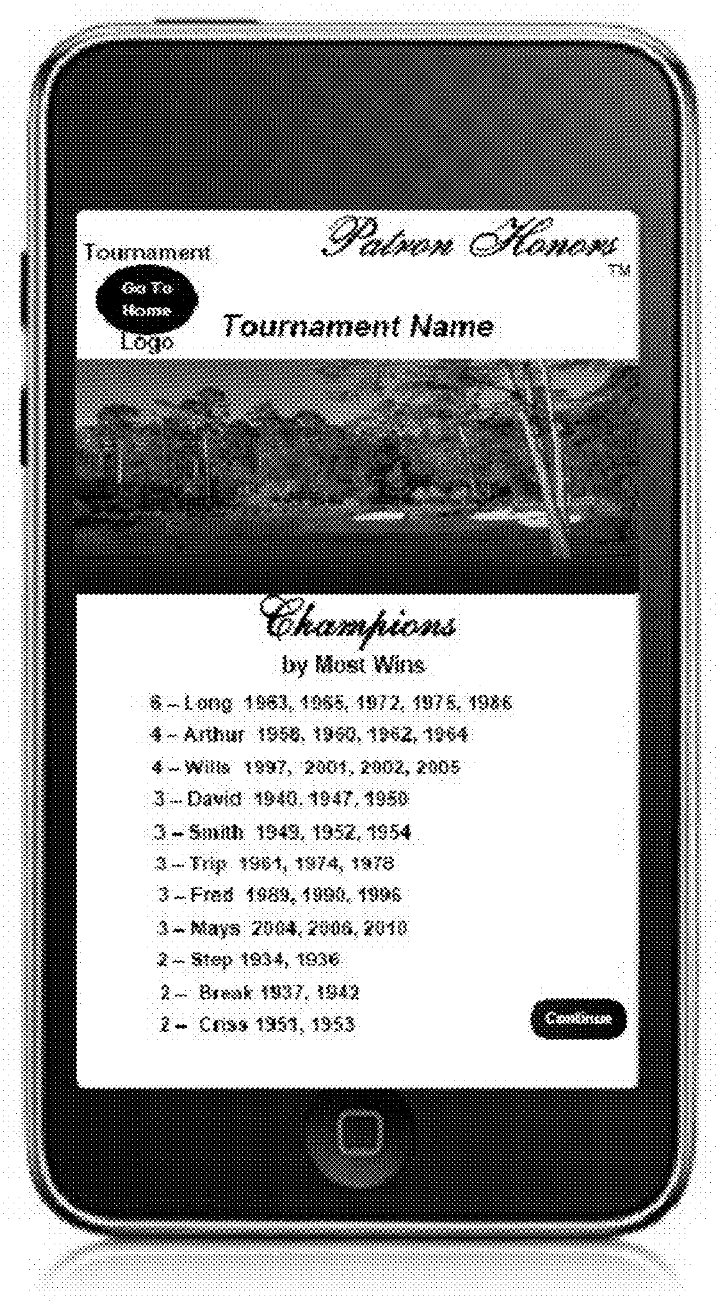
FIG. 30 illustrates a champions by name screen produced by selecting the "CHAMPIONS BY NAME" button on the messages, history, personal screen according to an example embodiment of the present general inventive concept.

FIG. 30 illustrates a champions by name screen produced by selecting the "CHAMPIONS BY NAME" button on the messages, history, personal screen according to an example embodiment of the present general inventive concept, including a list of previous tournament champions sorted by name.

Figure 31:
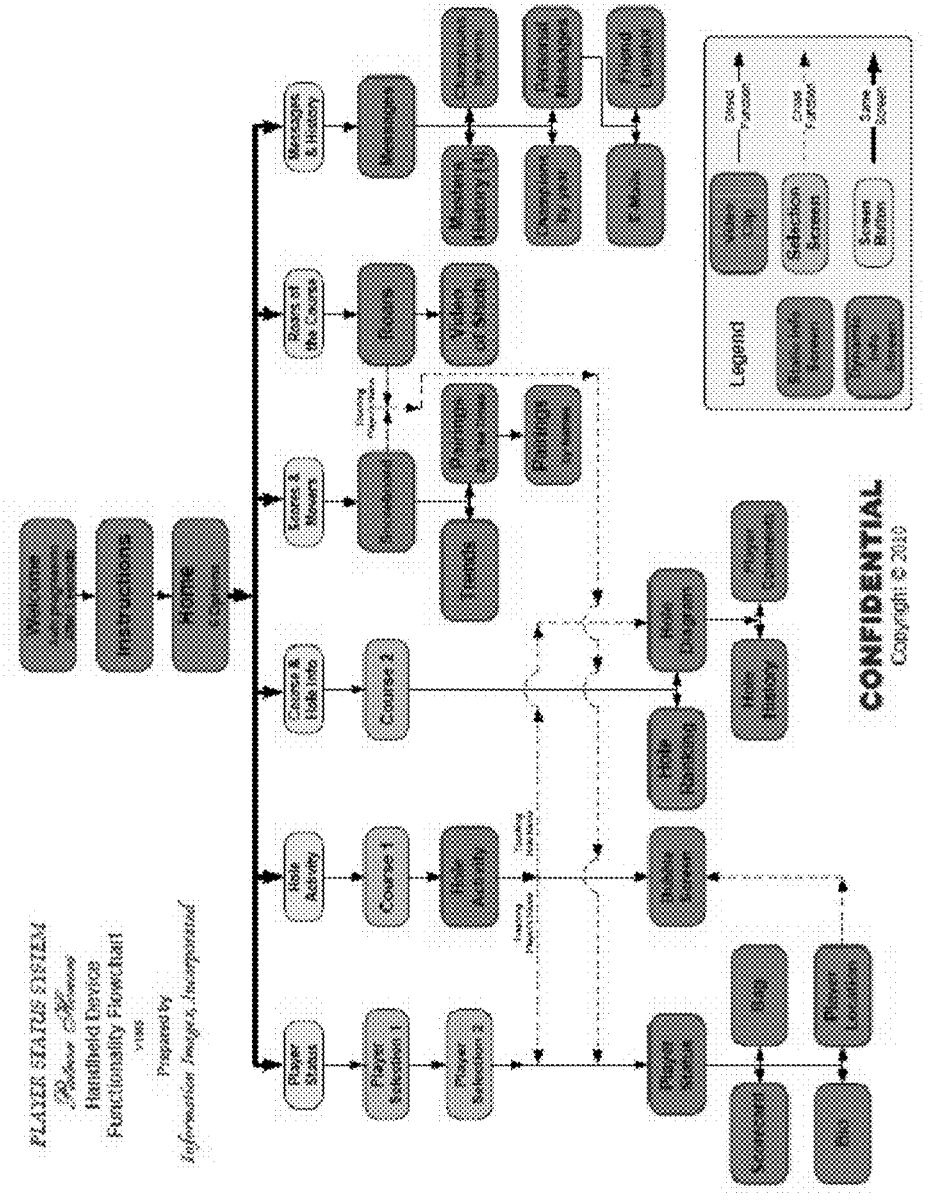
FIG. 31 is a flow chart illustrating example routines performed by the portable device configured according to an example embodiment of the present general inventive concept.

FIG. 31 is a flow chart illustrating example routines performed by circuitry of the portable device configured according to an example embodiment of the present general inventive concept.

Figure 32:
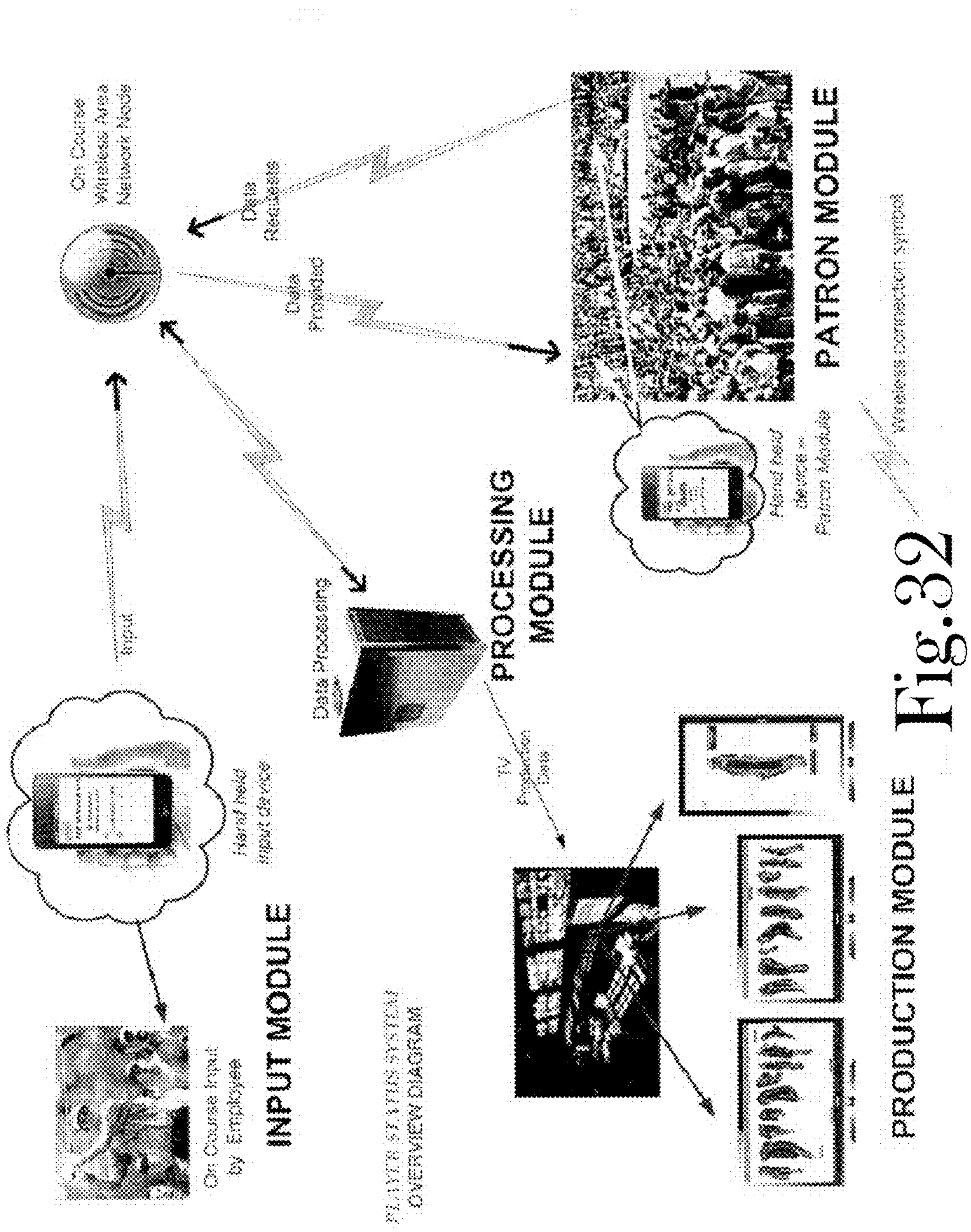
FIG. 32 is a block diagram illustrating representative components of a wireless network configured in accordance with an example embodiment of the present general inventive concept, including, a data input (spotter) module, a production/processing module, and a user (patron) module.

FIG. 32 is a block diagram illustrating representative components of a wireless network configured in accordance with an example embodiment of the present general inventive concept, including, a data input (spotter) module, a production/processing module, and a user (patron) module.

As described herein, the present general inventive concept can incorporate Global Positioning System (GPS) technology, alone or in combination with wireless triangulation techniques for greater accuracy, to provide location information about a particular golfer or activity. The GPS information can be accessed, processed and transmitted in known ways via the wireless network to provide location and movement information about the golf course and players to the handheld device carried by the patrons. Using GPS technology, it is possible to collect and record relevant data pertaining to a particular golf course, ahead of time, to generate a coverage map of the golf course. This data can then be incorporated into the functions of the present gathering and broadcasting system to enable the patron to track the location of golfers around the golf course, based on the GPS information, using the handheld device. The handheld devices used by the spotters and the patrons may or may not be the same device with merely different programming. However, if they are the same device, the GPS capabilities of spotter's device would be enhanced for greater accuracy in locating the position of the ball of a player by incorporating additional hardware, which may be connected to the handheld device by wire or wirelessly.

Still other embodiments will become readily apparent to those skilled in this art from reading the above-recited detailed description in view of all the drawings and figures.

The present general inventive concept can be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, DVDs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

It is noted that the simplified diagrams and drawings do not illustrate all the various connections and assemblies of the various components, however, those skilled in the art will understand how to implement such connections and assemblies, based on the illustrated components, figures, and descriptions provided herein. For example, it is possible to display historical data and current location and direction information of the players and/or balls in order to enhance the real-time tournament experience of the patrons.

It is also noted that numerous variations, modifications, and additional embodiments are possible, and accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Accordingly, while the present general inventive concept has been illustrated by description of several example embodiments, it is not the intention of the applicant to restrict or in any way limit the scope of the inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings.

What is claimed is:

1. A system of gathering, processing, and distributing information of a golf tournament over a wireless network, comprising:

a first portable device configured to be carried by a spotter of the golf tournament, the spotter having special permitted access to a golf course of the golf tournament and to participants of the golf tournament, the first portable device including a map of the golf course, the first portable device being configured to receive input data from the spotter regarding status of a selected player's golf ball during the golf tournament in real time after the golf ball has been hit by the selected player on a current hole of the selected player, the first portable device being configured to present information regarding the location and distance of the selected player's ball relative to the map of the golf course in real time after the ball has been hit by the selected player, the input data including information pertaining to the lie and the condition of the golf ball being tracked by the spotter and the selected player's strokes as they occur, the first portable device being configured to distribute the input data over the wireless network in real time during the golf tournament;

a second portable device carried by a user viewing the golf tournament to receive distributed input data over the wireless network, and to selectively display current statistics pertaining to the selected hole and graphical representations of the distributed input data according to an input from the user, the second portable device being configured to display pre-programmed information provided to the second portable device including endorsement information of manufacturers of equipment used by the respective participants of the golf tournament; and a production module configured to receive distributed input data over the wireless network simultaneously from a plurality of spotters covering various players of the golf tournament, the production module being configured to display distributed input data so as to selectively distribute at least a portion of the distributed input data to an external television network based on characteristics of displayed input data, the production module having a processing module connected between the production module and the wireless network, the processing module being configured to receive data requests over the wireless network simultaneously from a plurality of second portable devices and to distribute requested data to each second portable device over the wireless network based on received data requests from each second portable device, respectively.

2. The system of claim 1, wherein the pre-programmed information includes a strategy for playing particular holes of the golf course.

3. The system of claim 1, wherein the pre-programmed information includes comments from one or more participants of the golf tournament regarding a particular hole of the golf course.

4. The system of claim 1, wherein the first and second portable devices are programmable commercially available handheld devices.

5. The system of claim 1, wherein the first device is configured to acquire global positioning system (GPS) data corresponding to the first device and to selectively display a GPS survey of the golf course, wherein the first device is configured to calculate golf ball locations using the GPS data and/or GPS survey.

6. The system of claim 1, wherein the first portable device is configured to process the input data to determine a time input data is posted to the first portable device, and to determine an elapsed time since input data is posted.

7. The system of claim 1, wherein the graphical representation includes a video replay of a notable event of the golf tournament, and a time at which the notable event occurred.

8. The system of claim 1, wherein characteristics of displayed input data include one or both of an order of play of the various players of the tournament and a ranking of the various players of the tournament.

9. The system of claim 1, wherein the graphical representations include a map of the hole the selected player is currently playing, a playing partner of the selected player, and the order of play of a group of players on a particular hole.

10. The system of claim 1, wherein the graphical representations include information about historical tournament results and historical player performance.

11. The system of claim 1, wherein the second portable device includes a user interface to selectively display an endorsement pertaining to a particular participant of the golf tournament.

12. The system of claim 1, wherein the graphical representation includes statistics relating to the total number of birdies, pars, and bogies scored by the participants on respective holes of the golf course.

13. A method of gathering, processing, and distributing information of a golf tournament over a wireless network, the method comprising:

providing a first portable device to be carried by a spotter of the golf tournament, the first portable device including a map of the golf course, the spotter having special permitted access to a golf course of the golf tournament and to participants of the golf tournament;

inputting data by the spotter to the first portable device regarding status of a player's golf ball during the golf tournament in real time after the golf ball has been hit by the player on a current hole of the player, the first portable device being configured to present information regarding the location and distance of the player's ball relative to the map of the golf course in real time after the ball has been hit by the player, the input data including information pertaining to the lie and the condition of the golf ball being tracked by the spotter and the player's strokes as they occur;

distributing input data over the wireless network to a second portable device carried by a user in real time during the golf tournament, the second portable device being configured to display endorsement information provided to the second portable device including endorsements of respective participants of the golf tournament by manufacturers of equipment used by the respective participants of the golf tournament;

distributing input data over the wireless network to a production module simultaneously from a plurality of spotters covering various players of the golf tournament, the production module being configured to display distributed input data so as to selectively distribute a portion of the transmitted input data to an external television network based on characteristics of displayed input data, the production module having a processing module connected between the production module and the wireless network, the processing module configured to receive data requests over the wireless network simultaneously from a plurality of second portable devices and to distribute requested data to each second portable device over the wireless network based on received data requests from each second portable device, respectively; and selectively displaying graphical representations of the transmitted data and endorsement information on the second portable device according to inquiries of the user.

14. The method of claim 13, further comprising:

acquiring global positioning system (GPS) data corresponding to the first portable device;

recording geographical and/or topographical information of the golf course to generate a GPS coverage map of the golf course;

distributing the GPS coverage map to the second portable device; and displaying graphical representations of golf ball locations relative to the golf course after the golf ball has been hit by the player of the golf tournament, based on the GPS coverage map and the location of the first portable device transmitted to the second portable device.

15. The method of claim 14, wherein the first device is configured to calculate golf ball locations using the GPS data and/or GPS coverage map based on a distance of a player's golf ball from a yardage marker of the golf course.

16. A method of gathering, processing, and broadcasting sports information of a golf tournament over a network, the method comprising:

providing a first portable device to be carried by a spotter of the golf tournament, the first portable device including a map of the golf course, the spotter having special permitted access to a golf course of the golf tournament and to participants of the golf tournament;

inputting data by a spotter to the first portable device regarding status of a player's golf ball during the golf tournament in real time after the golf ball has been hit by the player on a current hole of the player, the first portable device being configured to present information regarding the location and distance of the player's ball relative to the map of the golf course in real time after the ball has been hit by the player, the input data including information pertaining to the lie and the condition of the golf ball being tracked by the spotter and the player's strokes as they occur;

providing a second portable device to users viewing the golf tournament, the second portable device being configured to display endorsement information providing to the second portable device including endorsements of respective participants of the golf tournament by manufacturers of equipment used by the respective participants of the golf tournament;

distributing the input data over the network to the second portable device in real time during the golf tournament;

configuring the second portable device to accept a user input from the user to selectively display a graphical representation of distributed input data on the second portable device; and distributing input data over the network to a production module simultaneously from a plurality of spotters covering various players of the golf tournament, the production module being configured to display distributed input data such that the production module selectively distributes a portion of the distributed input data to an external television network based on characteristics of displayed input data, the production module having a processing module connected between the production module and the network, the processing module configured to receive data requests over the wireless network simultaneously from a plurality of second portable devices and to distribute requested data to each second portable device over the wireless network based on received data requests from each second portable device, respectively.

17. The method of claim 16, further comprising:

acquiring global positioning system (GPS) data corresponding to a location of multiple second portable devices; and displaying a location of one of the second portable devices relative to another second portable device on at least one of the second portable devices.

18. The method of claim 16 wherein the first device is configured to acquire global positioning system (GPS) data corresponding to the first device and to selectively display a GPS survey of the golf course, wherein the condition of the ball includes a location of the ball relative to the GPS survey.

19. The method of claim 18, wherein the first device is configured to calculate golf ball locations using the GPS data and/or GPS survey based on a distance of a player's golf ball from a yardage marker of the golf course.

* * * * *